United States Patent [19]
Egan
[11] Patent Number: 4,544,590
[45] Date of Patent: Oct. 1, 1985

[54] LAMINATED MEMBER AND METHOD OF MAKING SAME

[75] Inventor: James R. Egan, Cincinnati, Ohio
[73] Assignee: Miller Products, Inc., New Philadelphia, Ohio

[21] Appl. No.: 359,183
[22] Filed: Mar. 17, 1982
[51] Int. Cl.[4] ........................ B32B 31/04; B32B 31/12; B42D 15/00
[52] U.S. Cl. ........................................ 428/40; 428/41; 428/42; 428/914; 428/352; 156/234; 156/240; 156/241
[58] Field of Search ..................... 428/914, 40, 41, 42, 428/352, 202; 156/234, 240, 241

[56] References Cited

U.S. PATENT DOCUMENTS

| | | | |
|---|---|---|---|
| 2,190,210 | 2/1940 | Kaber | 428/202 |
| 2,560,566 | 7/1951 | Graves et al. | 154/125 |
| 2,567,067 | 9/1951 | Grupp et al. | 428/40 |
| 2,648,924 | 8/1953 | Brewster | 428/40 X |
| 3,067,054 | 12/1962 | Reese | 428/40 |
| 3,226,910 | 1/1966 | Steffey | 53/3 |
| 3,459,626 | 8/1969 | Morgan | 428/914 X |
| 3,524,271 | 8/1970 | Buske | 40/2 |
| 3,524,782 | 8/1970 | Buske | 156/248 |
| 3,556,894 | 1/1971 | Bernard | 428/914 X |
| 3,607,525 | 9/1971 | Stioin | 428/914 X |
| 3,690,909 | 9/1972 | Finley | 428/40 |
| 3,843,480 | 10/1974 | Dreher | 161/167 |
| 3,869,328 | 3/1975 | Instance | 156/285 |
| 3,958,051 | 5/1976 | Smith | 428/42 |
| 4,068,028 | 1/1978 | Samonides | 428/40 |
| 4,070,220 | 1/1978 | Cavender | 156/227 |
| 4,121,961 | 10/1978 | Brunette et al. | 156/249 |
| 4,157,410 | 6/1979 | McClintock | 428/40 |
| 4,208,231 | 6/1980 | Hoppe et al. | 156/247 |
| 4,220,490 | 9/1980 | Carlson | 156/257 |
| 4,253,899 | 3/1981 | Takemoto et al. | 156/277 |
| 4,359,358 | 11/1982 | Hattemer | 428/914 X |
| 4,398,985 | 8/1983 | Eagon . | |
| 4,400,419 | 8/1983 | Laczynski | 428/78 X |
| 4,479,838 | 10/1984 | Dunsirn . | |

*Primary Examiner*—George F. Lesmes
*Assistant Examiner*—Nancy B. Swisher
*Attorney, Agent, or Firm*—Michael Sand Co.

[57] ABSTRACT

A method of making an improved laminated member such as a membership card, label, coupon or other die-cut member having indicia printed on one or both sides which is bonded to a base sheet for shipment of display and which when removed from the base sheet leaves no exposed adhesive on either the base sheet or indicia-bearing member. A pair of transparent plastic sheets are releasably joined together by thermal pressure and are attached to a carrier sheet by a pressure-sensitive adhesive. Indicia are printed in mirror image on an exposed side of one of the plastic sheets and the card or label is bonded by an adhesive to this mirror image printed side. Additional indicia are printed on the other side of the card or label. This laminated member then can be die cut forming a plurality of individual labels or cards on the carrier sheet. These cards or labels then are stripped from the carrier sheet and applied by the pressure-sensitive adhesive remaining thereon onto individual base sheets for mailing and/or distribution. The adherence of the adhesive which attaches the laminated member on the base sheet is greater than the adherence between the joined plastic sheets, whereby the plastic sheets will separate upon removal of the label or card from the base sheet to provide a card having printing on both sides and without any adhesive being exposed either on the card or base sheet.

14 Claims, 24 Drawing Figures

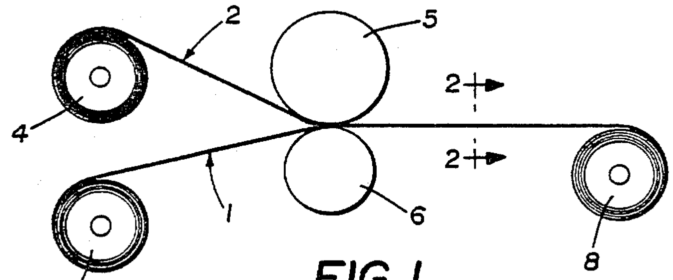
FIG. 1
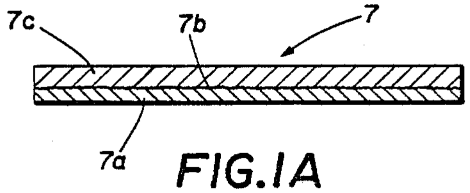
FIG. 1A
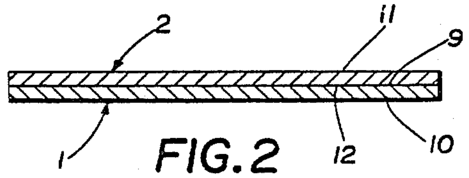
FIG. 2
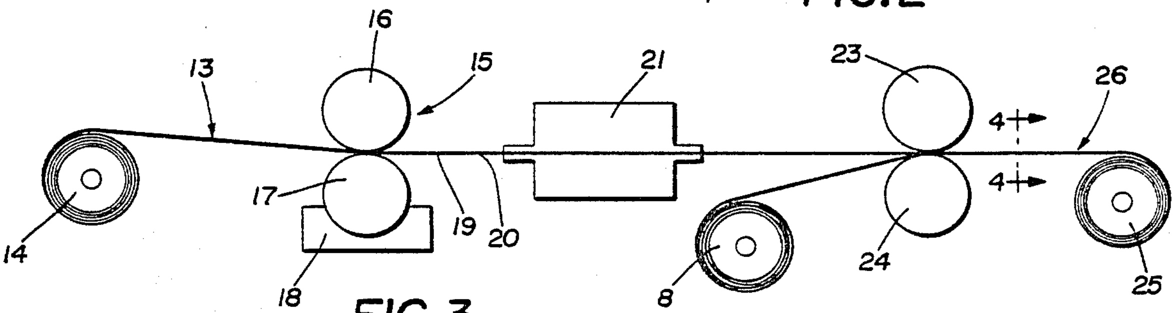
FIG. 3
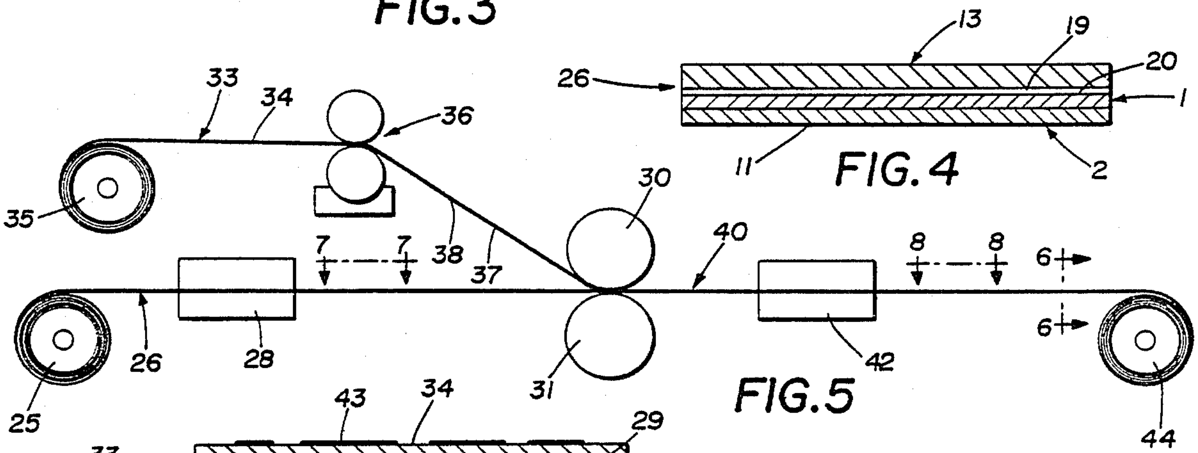
FIG. 4
FIG. 5
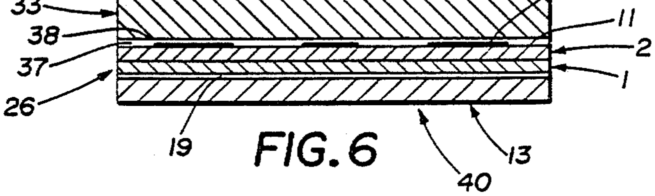
FIG. 6
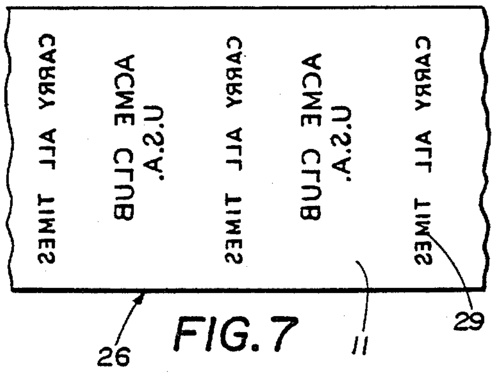
FIG. 7
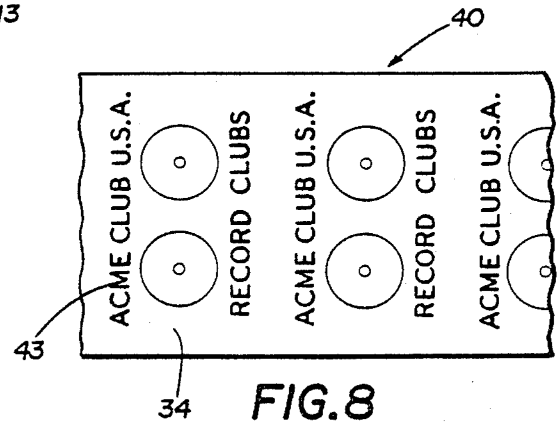
FIG. 8

LAMINATED MEMBER AND METHOD OF MAKING SAME

BACKGROUND OF THE INVENTION

1. Field of the Invention

The invention relates to a laminated member which may have printed indicia visible on one or both sides of the member and which has a pressure-sensitive adhesive for temporarily mounting the member on a carrier sheet from which it may be removed for application to an article, and to the art of making such a laminated member. More particularly, the invention relates to such a laminated member which when removed from an article or base sheet is free of exposed adhesive on either the member itself or supporting article or sheet.

2. Description of the Prior Art

There are numerous types and constructions of laminated members such as labels, organization membership and identification cards, coupons, credit cards and the like, as well as methods of making the same. Usually these members will be die cut from strips of laminated materials and will have a pressure-sensitive adhesive on one side which releasably mounts the die-cut members on a strip of backing paper which has an adhesive release coating. This release coating enables the individual die-cut members to be removed easily either automatically or manually from the backing strip. The adhesive remains on the removed member, enabling the member to be attached to an article, base sheet, or other surface.

These individual die-cut laminated members may have printed indicia on the exposed top surface that was applied while the laminated member was in strip form prior to die cutting or was applied after the member was removed from the carrier strip and applied to a surface. This printing may be covered by a thin transparent sheet of plastic after the printing has been applied to prevent alteration or disfiguration of the printing.

One problem that exists with such known laminated members die cut from strips of the laminated material is that it is difficult to form such a member in strip form for subsequent removal and attachment to other sheets in which printing can be applied to both sides of the final laminated member. Also, another problem with such laminated members and the method of making them is that upon removal of the die-cut member from a surface to which it is attached by the pressure-sensitive adhesive, adhesive will be exposed either on the removed member or on the surface from which it has been removed. This exposed adhesive is unsatisfactory and presents problems for many applications.

One application in which a plurality of individual laminated members are die cut from a carrier strip is in the production of credit cards and organization membership and identification cards. It is desirable that printing be on both sides of these cards and that the cards be mass produced by conventional label-forming equipment so they can be removed from the carrier sheet and applied by automatic dispensing equipment to a base sheet for subsequent mailing to the individual recipients. However, when the individual recipient removes the card from the mailing sheet, the pressure-sensitive adhesive which attached the card on the mailing sheet remains either on the sheet or on the membership card, which is unsatisfactory. Also, it is desirable to protect the printing which is on the card so the same cannot be altered or obliterated by use.

Another application in which individual die-cut laminated members are used is in machine-printed and machine-readable identifying tags, labels and coupons of the type that are mounted on perforated paper which is passed through a line printer, computer or similar machines. This application enables the information which is printed on the labels to be accurately controlled, such as the labels attached to clothing or other items for which inventory control is essential. However, the exposed adhesive on such labels or on the backing paper from which they are removed presents problems, especially where the removed labels are subsequently attached to a garment or the like by other attachment means wherein the adhesive is no longer required and is not desired.

Various methods and laminated members have been devised which provide some of the features discussed above, such as a protective coating over printing on one side of the label, as well as a laminated member having pressure-sensitive adhesive for applying the member to a carrier sheet. Examples of such laminated members and methods of making them are shown in U.S. Pat. Nos. 2,560,566, 3,226,910, 3,524,271, 3,524,782, 3,843,480, 3,869,328, 3,958,051, 4,068,028, 4,070,220, 4,121,961, 4,208,231, 4,220,490 and 4,253,899.

No known laminated member or method of making the same of which I am aware provides the advantages as those provided by my invention which is described in detail below.

SUMMARY OF THE INVENTION

Objectives of the invention include providing a laminated member which is mounted on a release backing sheet by a layer of a pressure-sensitive adhesive, enabling the member to be stripped away from a release sheet for application either automatically or manually to any clean surface, in which a portion of the member can be subsequently removed from this surface by separating two releasably joined plastic sheets without any adhesive being exposed on either the removed member portion or surface from which it was removed, and in which the removed portion can have printed indicia visible on both sides thereof. Another objective is to provide such a laminated member which can be formed of a variety of substances, such as paper of various thicknesses, flexibility and surface coating, plastic sheets, thin metal sheets, or foil, etc.

A further objective of the invention is to provide such a laminated member in which the members are die cut from elongated strips of such laminated materials having a carrier or backing sheet whereby the die-cut members can remain on the elongated sheet which is wound into roll form for subsequent shipment and/or storage, and in which the individual members then can be dispensed from the roll onto a surface or article and retained thereon by a layer of pressure-sensitive adhesive. Another objective is to provide such a laminated member in which one or both surfaces of a portion of the member is covered with a sheet of transparent plastic which protects printed indicia thereon from subsequent alteration and disfiguration.

Still another objective of the invention is to provide such a laminated member which has extensive application in the product packaging, food processing, coupon redemption, graphic art and design, advertising and sales promotion, publishing and direct mail advertising industries, and also in the inventory control and material movement control system industries. The improved laminated member uses can also include label/coupons for consumer products, instant redemption retail coupons, fast food promotional coupons, direct mail and advertising return coupons, retail safety labels, warranty cards, publication promotional coupons, greeting cards and novelty uses. Also, the improved laminated member can be releasably mounted on a backing paper which is adaptable for use with on-line printers or automatic coded indicia-readable machines for accurate information printing and inventory control, and in which no adhesive is exposed on either the backing sheet or label when removed therefrom.

Another objective is to provide such a laminated member which includes two sheets of transparent plastic that are releasably joined by pressure and heat without any adhesive to provide a bonding force therebetween which is greater than the bonding force between the layer of pressure-sensitive adhesive and release backing sheet but less than the bonding force between the pressure-sensitive adhesive and most surfaces on which the laminated member is attached so that the two sheets of plastic can be separated with one side of the removed portion being covered by one of the transparent plastic sheets to exposed printed indicia thereon and with the other plastic sheet remaining on the surface to which the laminated member had been attached to cover the pressure-sensitive adhesive, thereby eliminating any adhesive being exposed on either the separated or remaining portions of the laminated member.

Still another objective is to provide a method for making such a laminated member which utilizes usual label-making equipment for applying the pressure-sensitive adhesive and for die cutting the individual members on the carrier strip, and in which the final laminated member can be removed by usual label-dispensing equipment for application to a base sheet or other surface on which it is to be mounted. A further objective is to provide a method for mass producing such a laminated member in a highly efficient manner and at reduced cost, which eliminates problems which have existed in the art, and which achieves the stated objectives simply and effectively.

These objectives and advantages are obtained by the improved laminated member, the general nature of which may be stated as including a carrier having an adhesive release coating applied to one side thereof; a first sheet of plastic having a pressure-sensitive adhesive on one side thereof releasably securing said first sheet of plastic on the side of the carrier having the release coating; a second sheet of plastic releasably secured on one side to another side of the first sheet of plastic; a top sheet of material suitable for receiving printed indicia thereon secured to another side of the second sheet of plastic; and said sheets of plastic being releasably secured together with a greater force than the force provided by the adhesive between the first sheet of plastic and the carrier whereby the carrier may be stripped from the first sheet of plastic with said pressure-sensitive adhesive remaining on said first sheet for subsequent attachment of the joined plastic sheets and top sheet of material by said adhesive to a base sheet of material.

These objectives and advantages are further obtained by the improved method of producing a laminated member, the general nature of which may be stated as including the steps of releasably joining together first and second sheets of plastic; securing the first sheet of plastic of said joined plastic sheet by an adhesive to a base sheet of material; and securing a top sheet of material suitable for receiving printed indicia to the second sheet of plastic by an adhesive to provide a laminated member with the securing forces provided by the adhesives being greater than the securing force between the two sheets of plastic whereby the first and second sheets of plastic may be separated from each other with said second sheet of plastic remaining secured to the top sheet of material and the first sheet of plastic remaining secured to the base sheet of material eliminating any exposed adhesive on either the removed top sheet of material or on the base sheet of material.

BRIEF DESCRIPTION OF THE DRAWINGS

A preferred embodiment of the invention, illustrative of the best modes in which applicant has contemplated applying the principles, is set forth in the following description and shown in the accompanying drawings, and is particularly and distinctly pointed out and set forth in the appended claims.

FIG. 1 is a diagrammatic view of the method step showing the two sheets of transparent plastic being releasably secured together;

FIG. 1A is a greatly enlarged sectional view of a modified form of one of the two sheets of plastic;

FIG. 2 is a greatly enlarged sectional view taken on line 2—2, FIG. 1, of the two sheets of plastic joined together by the procedure of FIG. 1;

FIG. 3 is a diagrammatic view showing the method steps of a carrier or backing sheet being coated on one side with an adhesive and then being bonded to the joined plastic sheets of FIGS. 1 and 2;

FIG. 4 is a greatly enlarged sectional view taken on line 4—4, FIG. 3, of the carrier bonded to the joined plastic sheets by the procedures of FIG. 3;

FIG. 5 is a diagrammatic view showing the step of printing indicia in mirror image on one side of the partially laminated member produced by the steps of FIG. 3, and the subsequent steps of bonding a top sheet of material over the printed indicia, followed by the printing of additional indicia on the exposed side of the applied top sheet of material;

FIG. 6 is a greatly enlarged sectional view taken on line 6—6, FIG. 5, showing the laminated member produced by the procedures of FIGS. 1, 3 and 5;

FIG. 7 is an enlarged fragmentary plan view looking in the direction of arrows 7—7, FIG. 5, showing the mirror image printed indicia which is applied to one of the plastic sheets by the first printing procedure shown in FIG. 5;

FIG. 8 is an enlarged fragmentary plan view looking in the direction of arrows 8—8, FIG. 5, showing the printed indicia on the exposed top sheet of material by the second printing procedure shown in FIG. 5;

Similar numerals refer to similar parts throughout the drawings.

DESCRIPTION OF THE PREFERRED EMBODIMENT

Figure 9:
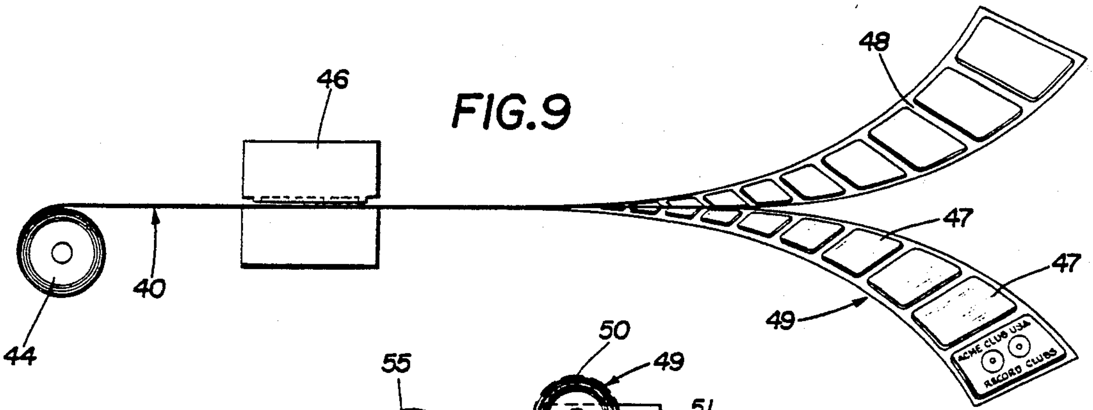
FIG. 9 is a diagrammatic view showing the die-cutting step of the laminated member of FIG. 6 with the matrix being removed therefrom.

The steps of the improved method are shown diagrammatically in FIGS. 1, 3, 5, 9, 10, 13, 14 and 16, with the laminated member produced by the improved method being shown principally in greatly enlarged and exaggerated views in FIGS. 6, 12, 15 and 18. The initial step of the improved method is shown in FIG. 1 and consists of releasably joining together first and second sheets of transparent plastic, indicated generally by numerals 1 and 2. Sheets 1 and 2 are supplied from rolls 3 and 4, respectively, and are joined together by passing the sheets between rolls 5 and 6 which apply sufficient pressure and heat for releasably connecting the elongated sheets of plastic 1 and 2.

Joined plastic sheets 1 and 2 then are wound into a roll 8. Rolls 8 can be shipped to another location or stored until further processed into strips of a laminated material from which the improved laminated member is produced. If desired, the joined plastic sheets can be fed directly into the next step of the process, as described below and shown in FIG. 3, without first being wound into roll 8.

Sheets 1 and 2 preferably will be elongated strips or sheets of transparent plastic material ranging from several inches to several feet in cross-sectional width and supplied from rolls of such material. The wider sheets ultimately will be slit into a plurality of narrower width strips for their final intended use in most situations.

Sheets 1 and 2 may be formed of various materials which have the necessary characteristics to achieve the final laminated member. One type of plastic found suitable for the formation of sheet 1 is a clear polyester film, approximately two mils thick, with sheet 2 being a similar type of polyester plastic film approximately ¾ mil thick. Another type of plastic sheet found satisfactory for sheet 1 is a sheet formed of two separate films which is produced by Cloudsley Incorporated of Cincinnati, Ohio, and designated as No. 87MPEM (FIG. 1A). This combined plastic sheet 7 consists of a ½ mil thick film *7a* of MYLAR which is the trademark of E. I. Du Pont de Nemours and Company for its polyester film. Film *7a* is applied by an adhesive *7b* to a 1½ mil thick film *7c* of polyethylene which has an EVA (ethyl vinyl acetate) additive. Although sheet 1 may be formed of such a two-film construction, it is shown in the drawings and described throughout as being a single sheet for purposes of clarity. Also, various other plastic sheets may be releasably joined than those described above in achieving the improved results of my invention.

The joined plastic sheets 1 and 2 are shown in a greatly exaggerated condition in FIG. 2 for purposes of illustration. Sheet 1 has top and bottom surfaces 9 and 10, and sheet 2 has top and bottom surfaces 11 and 12. Sheet surfaces 9 and 12 are releasably joined with each other by the heat and pressure exerted and applied thereto by rolls 5 and 6.

Next, a carrier backing sheet, indicated generally at 13 (FIG. 3), is paid out from a roll 14 and passed through a usual adhesive coating machine, indicated generally at 15. Machine 15 may consist of a pair of rolls 16 and 17 and a supply of pressure-sensitive adhesive 18. A layer of adhesive 19 is applied by machine 15 to surface 20 of carrier 13 which has an adhesive release coating (not shown) applied to surface 20. The adhesive-coated strip then is passed through a dryer 21 which dries the adhesive to form a tacky, pressure-sensitive coating on carrier surface 20.

Next, joined plastic sheets 1 and 2 are unwound from roll 8 and are releasably bonded to carrier sheet 13 by passing the carrier sheet and joined plastic sheets between a pair of pressure rolls 23 and 24. Adhesive 19 releasably bonds surface 20 of carrier sheet 13 to surface 10 of sheet 1. The partially formed laminated strip or sheet, indicated generally at 26, which is produced by the steps of FIGS. 1 and 3, is shown in an enlarged exaggerated view of FIG. 4. After passing between rolls 23 and 24, strip 26 is wound into a roll 25.

The release coating which is applied to surface 20 of carrier sheet 13 provides a lesser bonding engagement or adhesion between carrier sheet 13 and plastic sheet 1 than the bonding adhesion existing between plastic sheets 1 and 2. One form of carrier backing sheet 13 is a usual type of paper referred to as kraft paper having a 40-, 50- or 60-pound weight with a silicone coating. This silicone coating provides the adhesive release feature by enabling only a limited bonding to be obtained between adhesive 19 and the silicone coating. This enables the joined plastic sheets and the adhesive material to be removed easily from carrier strip 13 without any adhesive adhering to the carrier strip. This release coating and result is well known in the art.

Roll 25 of partially laminated strip 26 is unwound and passed through a first printing station 28 which prints indicia in mirror image form on exposed surface 11 of plastic sheet 2. This printed indicia is indicated at 29 in FIG. 6 in a greatly exaggerated condition for purposes of clarity. Partially laminated strip 26 then passes between a pair of rolls 30 and 31 where it is bonded to a strip of flexible material, indicated generally at 33, of a suitable quality which is compatible to the intended use of the final laminated member. Preferably, flexible material 33 will be suitable for receiving printed indicia on its exposed surface 34.

Strip 33 is unwound from a roll 35 of such material and is passed through a usual adhesive-applying machine 36 wherein a layer of adhesive 37 is applied to surface 38 of strip 33 for bonding strip 33 to partially laminated strip 26. Surface 38 of strip 33 is bonded by adhesive 37 to surface 11 of sheet 2 which has the printed indicia 29 thereon and therefore must be a transparent adhesive. A type of adhesive found suitable is made by Technicote of Cuyahoga Falls, Ohio, as Product No. 36-6166.

The laminated strip produced by the step of FIG. 5 is indicated generally at 40 and is shown in detail in FIG. 6. Strip 40 then is passed through a second printing station 42, wherein additional printed indicia 43 is printed on exposed top surface 34 of strip 33. The laminated strip 40 then can be wound into a roll 44 for storage or shipped to a remote site, if desired. Printed indicia 43 is shown particularly in FIG. 8 and is in readable form as opposed to the mirror image printed indicia 29 which was previously applied to plastic sheet surface 11 and which is shown in FIG. 7. The adhering force provided by adhesive layer 37 is greater than the adherence between plastic sheets 1 and 2.

Strip 40 then is unwound from roll 44 and passed through a die-cutting station 46 which forms a plurality of individual laminated members 47 which remain releasably mounted on uncut carrier strip 13. The matrix produced by the die-cutting station 46 is indicated at 48 and is disposed of as scrap. The strip of individually die-cut laminated members 47, which is indicated at 49, then can be wound into roll form, indicated at 50 (FIG. 10), for subsequent processing according to the ultimate use of laminated members 47. The particular laminated member 47 produced by the above-described procedures is indicated as being a membership card to a record club and is used for illustrative purposes only, since the printed indicia could be of various natures and for completely different final uses.

Figure 10:
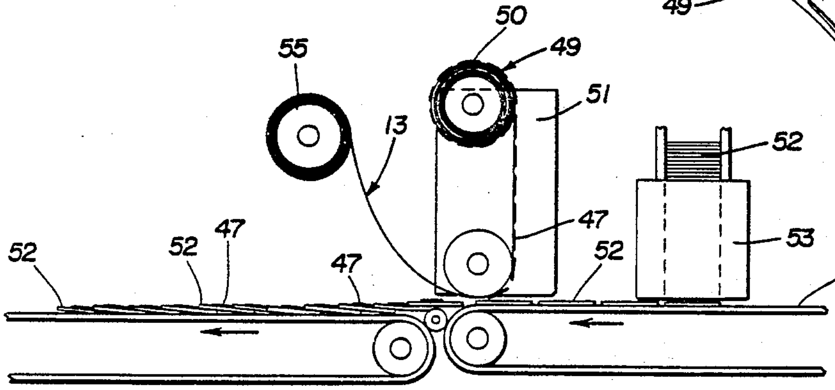
FIG. 10 is a diagrammatic view showing the automatic stripping of the die-cut laminated members of FIG. 9 from the carrier and subsequent placement of the removed laminated members on individual base sheets.

FIG. 10 illustrates one manner in which improved individual laminated members 47 may be used. Roll 50 of die-cut strip 49 is mounted on a dispensing machine 51 which automatically dispenses the individually die-cut laminated members 47 onto preaddressed cards, mailers or other base sheets or members 52, which may be ejected by a dispenser 53 onto a conveyor 54. Carrier strip 13 is merely collected in a roll 55 for subsequent disposal after automatic removal of laminated members 47 therefrom.

Figure 11:
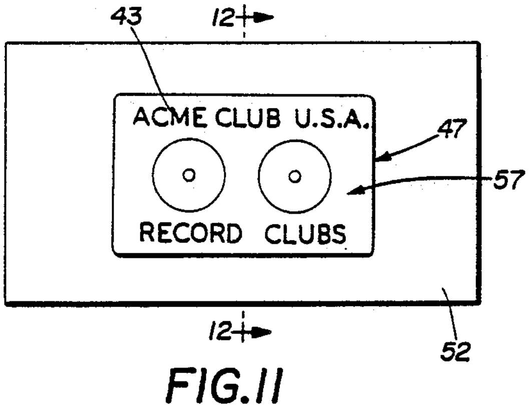
FIG. 11 is an enlarged plan view showing one of the laminated members attached to a base sheet by the procedure of FIG. 10.
Figure 12:
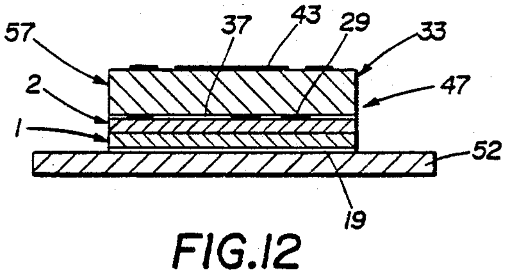
FIG. 12 is a greatly enlarged sectional view taken on line 12—12, FIG. 11.

FIG. 11 is a plan view showing the individual laminated member 47 mounted on base sheet 52. Member 47 is bonded to base sheet 52 by pressure-sensitive layer 19 which is exposed upon removal of backing sheet 13 therefrom. An enlarged, cross-sectional view of laminated member 47 bonded to base sheet 52 is shown in FIG. 12.

In accordance with one of the main features and advantages of the invention, the ultimate user or recipient of laminated member 47 and base sheet 52 will remove the identification or membership card portion, which is indicated at 57, from base sheet 52 by peeling the same therefrom. This peeling action will separate plastic sheets 1 and 2 from each other due to the bonding adhesion between sheet 2 and material strip 33 and between sheet 1 and base sheet 52 provided by adhesive layers 37 and 19, respectively, being stronger than the thermal bonding achieved between plastic sheets 1 and 2. Complete removal of card portion 57 will provide an identification card having printed indicia 29 and 43 on both sides of the card, with indicia 29 being protected by plastic sheet 2 which remains bonded to material strip 33. Plastic sheet 1 remains bonded by adhesive layer 19 to base sheet 52, thereby providing a membership card which is completely free of any adhesive on either side thereof, as well as eliminating any exposed adhesive on the base sheet from which it is removed. Base sheet 52 and plastic sheet 1 which is bonded thereto then are discarded.

If desired, another layer of a thin transparent plastic sheet could have been applied over printed indicia 43 on card surface 34 after the printing operation shown in FIG. 5 to protect printed indicia 43 from alteration or disfiguration.

Figure 13:
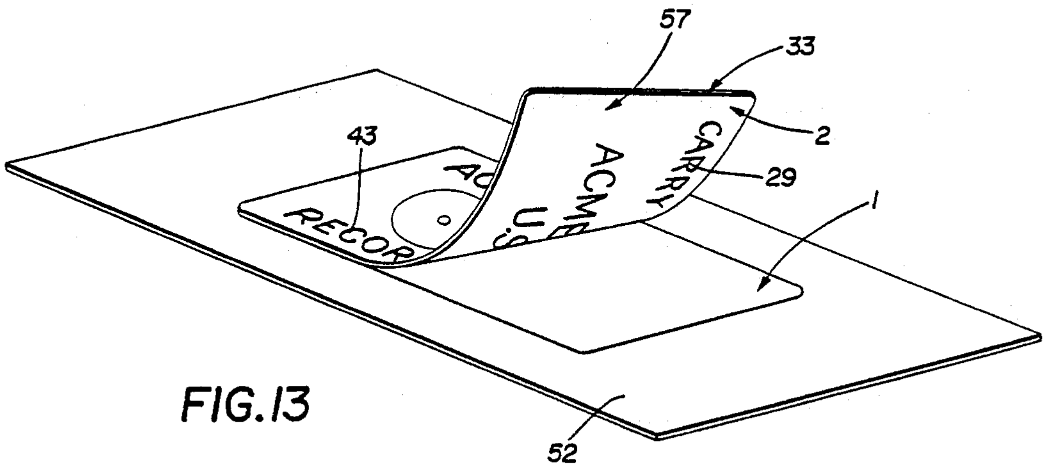
FIG. 13 is a perspective view showing the top sheet of printed material and attached sheet of plastic of the laminated member shown in FIGS. 11 and 12 being removed from the other sheet of plastic and base sheet.
Figure 14:
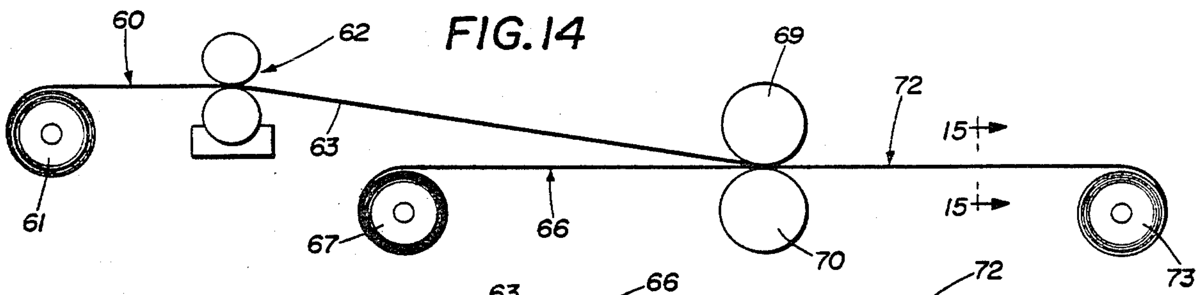
FIG. 14 is a diagrammatic view somewhat similar to FIGS. 3 and 5 showing the step of producing a modified form of the improved laminated member.

Laminated member 47 need not provide a membership card 57, as shown in FIG. 13 and described above, but can be of numerous types of materials and have various information printed on one or both sides thereof. Strip 33 which forms the main body of the laminated member and of the final card provided thereby may be of semiflexible plastic material and can have magnetic and coded information imprinted thereon by printing stations 28 and 42 and function as a machine-readable credit card. Member 47 could be a coupon, warranty card, greeting card, novelty item or countless other items, and may or may not be mailed to the ultimate user but can be applied directly to a product for subsequent removal therefrom instead of base sheet 52.

A modified form of the improved laminated member and the method of making the same is shown in FIGS. 14 through 18. A partially laminated strip of material, indicated generally at 60, is unwound from a reel 61 of such material and passed through an adhesive-applying machine 62 which applies an adhesive coating 63 to one surface of strip 60. Starting strip 60 is shown in exaggerated condition in FIG. 15 and is generally similar to strip 26 shown in FIG. 4 in that it consists of thermally releasably joined plastic sheets 1 and 2 which are secured on a backing carrier sheet 64 by an adhesive layer 65. Carrier sheet 64 is similar to carrier sheet 13 discussed above except that it does not have a release coating of silicone or similar materials thereon. This absence of a release coating provides a firmer bonding of joined plastic sheets 1 and 2 to carrier 64 by adhesive 65 than the adhesive force provided by the thermal joining of plastic sheets 1 and 2.

Figure 15:
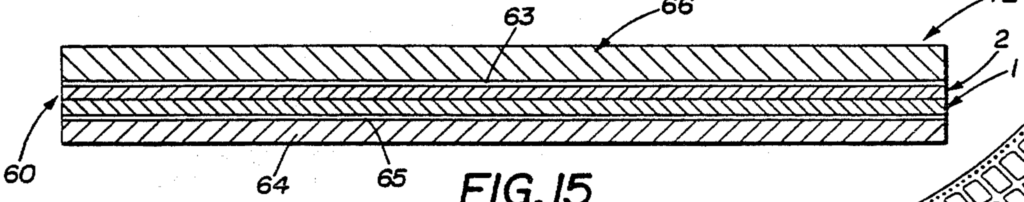
FIG. 15 is a greatly enlarged sectional view taken on line 15—15, FIG. 14.
Figure 16:
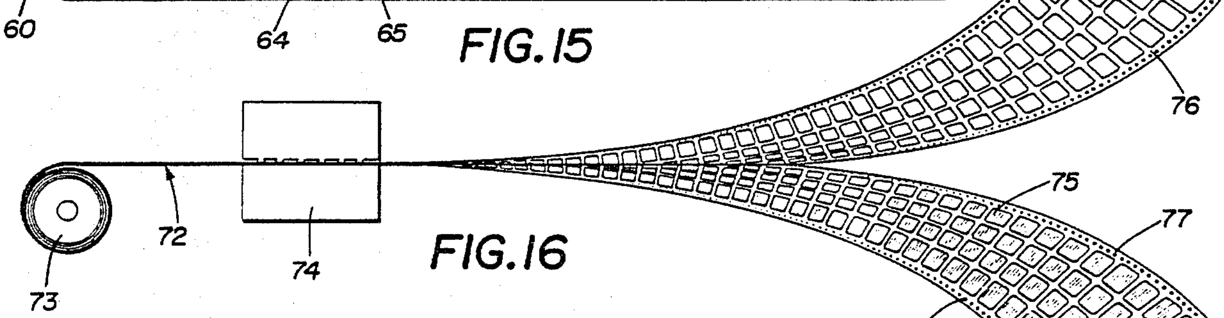
FIG. 16 is a perspective view similar to FIG. 9 showing the step of die cutting the laminated member of FIG. 15.

Next, a strip of tag stock 66 or other type of material similar to flexible material strip 33 discussed above is paid out of a reel 67 and bonded by adhesive 63 to the partially laminated strip 60 by pressure rolls 69 and 70, forming a laminated strip or member indicated generally at 72 and shown in section in FIG. 15. Adhesive coating 63 which bonds tag strip 66 to surface 11 of plastic strip 2 has a bonding force greater than that provided by the thermal bonding between plastic sheets 1 and 2.

Laminated strip 72 then is paid out of roll 73 and passed through a die-cutting machine 74 which die cuts strip 72 into a plurality of individual laminated labels, indicated at 75, which remain bonded to uncut carrier sheet 64 by adhesive 65. The matrix 76 produced by the die-cutting operation then is merely discarded as scrap.

In accordance with one of the features of the modified laminated member, carrier sheet 64 is a type of paper or stock which is formed with a plurality of edge perforations 77 so arranged whereby carrier sheet 64 and attached labels 75 can be passed through an on-line printing machine 78 or other types of automatic coded indicia reading and/or coding machines of the type used for inventory control, labeling, pricing, etc.

Figure 17:
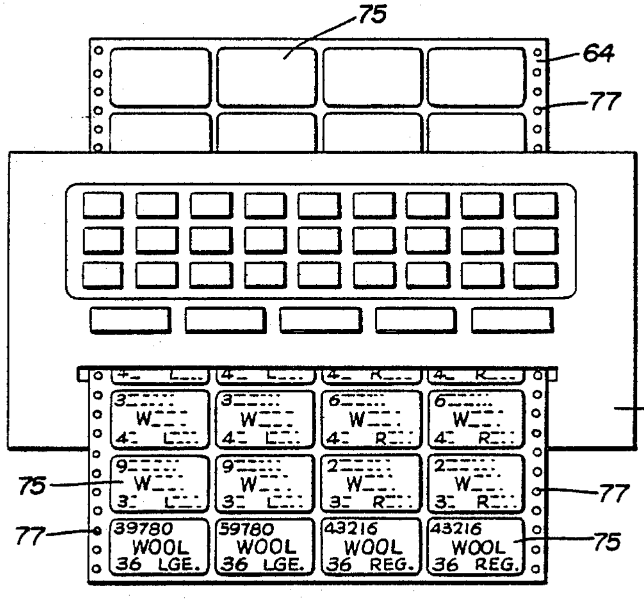
FIG. 17 is a diagrammatic view showing the die-cut laminated member of FIG. 16 having machine-printed indicia placed thereon.
Figure 18:
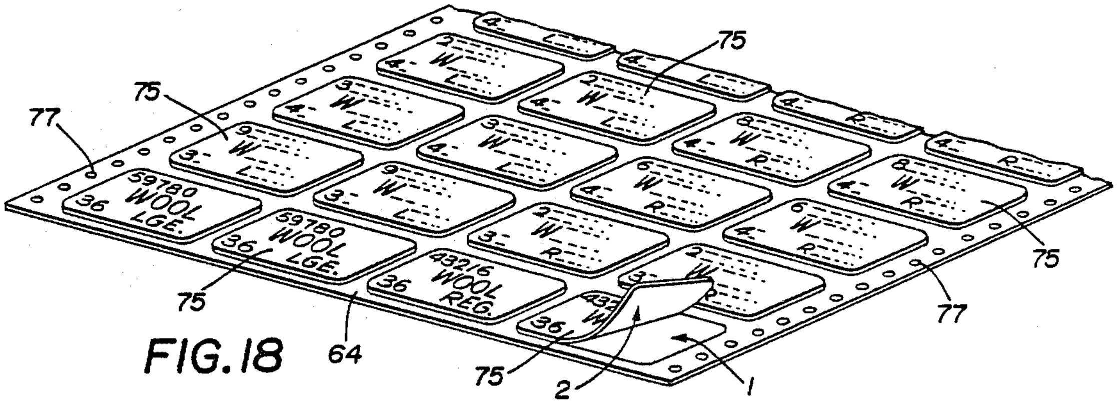
FIG. 18 is a perspective view similar to FIG. 13 showing one of the machine-printed tags being removed from the base carrier sheet.

The particular laminated labels 75 shown in FIGS. 17 and 18 are the type of labels which are sewn onto articles of clothing, such as suits. Sheets of such individual labels 75, as shown in FIG. 18, are supplied to the workers which individually remove a member 75 and sew it onto the garment. Again, in accordance with one of the main features of the invention, member 75 upon its removal from base sheet 64, as shown in FIG. 18, will separate plastic sheets 1 and 2 with sheet 2 remaining bonded to the bottom surface of the individual label with sheet 1 remaining bonded to base sheet 64. This ensures that both the tag and base are completely free of an exposed adhesive which would be extremely unsatisfactory for the garment workers. If any adhesive were exposed, it would continuously come into contact with the workers' hands and new clothing, causing a variety of problems.

The particular use of the improved laminated member shown in FIGS. 17 and 18 is merely one of a number of applications with which the improved laminated member and method of making the same may be employed.

Figure 19:
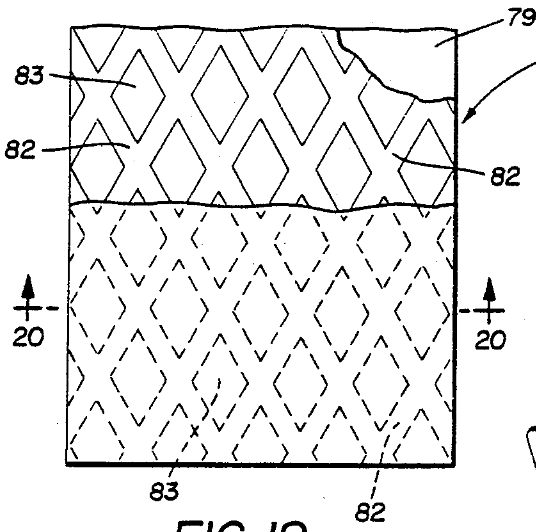
FIG. 19 is a top plan view with portions broken away of a modified laminated member.
Figure 20:
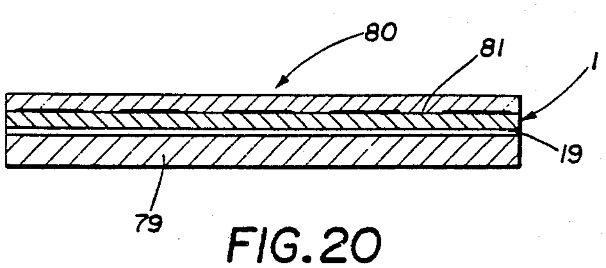
FIG. 20 is an enlarged sectional view taken on line 20—20, FIG. 19.
Figure 21:
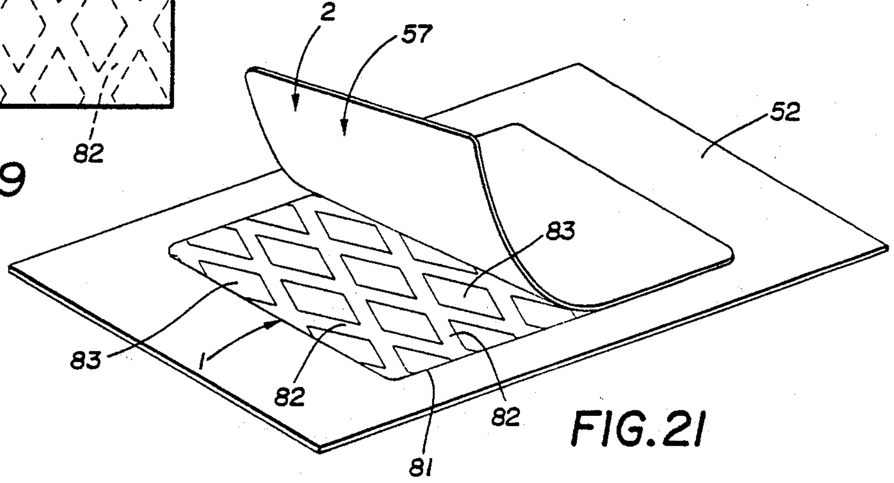
FIG. 21 is a perspective view similar to FIG. 13 showing the top sheet of printed material and attached sheet of plastic of the laminated member shown in FIGS. 19 and 20 being removed from the other sheet of plastic and a base sheet.

A further modification of the improved laminated member is shown in FIGS. 19 through 21 and is indicated generally at 80. Modified laminated member 80 is similar to partially laminated member 26 shown in FIG. 4 and includes carrier or base sheet 79 which may or may not have the silicone release coating thereon with plastic sheet 1 being bonded thereto by adhesive 19. The main difference between member 80 and laminated member 26 is that prior to the thermal bonding of plastic sheet 2 to sheet 1, a release agent is applied to certain areas of either of the mating surfaces of sheet 1 or of sheet 2. The release agent is shown in the drawings as being applied to surface 81 of sheet 1. The release coating or agent is applied to surface 81 in the form of spaced diamonds 83 which form a plurality of intersecting lines or stripes 82.

The release agent is applied by a coating roll or similar equipment having the diamond-shaped pattern thereon which forms the plurality of intersecting stripes 82 which become the bonding area between sheets 1 and 2. The coating prevents or considerably reduces the thermal bonding of sheet 2 to sheet 1 in these areas. This forms a plurality of unbonded or "lift areas" along both the longitudinal and transverse edges of the final laminated product which enables plastic sheets 1 and 2 to be separated from each other, as shown in FIG. 21, more easily than when the entire mating surfaces of sheets 1 and 2 are completely bonded together by the thermal pressure. The diamond-shaped pattern of the release areas provides lift areas along all edges of the laminated member regardless of the particular length and width of the final die-cut laminated member. Various types of release agents can be applied to surface 81 of sheet 1 prior to the thermal bonding of sheet 2 thereto. One particular type is an overprint release varnish having a silicone additive of the type manufactured by Cloudsley Incorporated of Cincinnati, Ohio designated as 210P2110.

This arrangement enables a membership card 57 or similar item to be removed easily from its base sheet 52 by separating plastic sheets 1 and 2 from each other by lifting upwardly on card 57 at any of the unbonded areas or lift edges provided by the diamond-shaped pattern, as shown in FIG. 21. This enables a stronger thermal bond to be imparted to the bonded areas while making the separation thereof more convenient and simpler. It provides for a better final product with less critical control.

Figure 22:
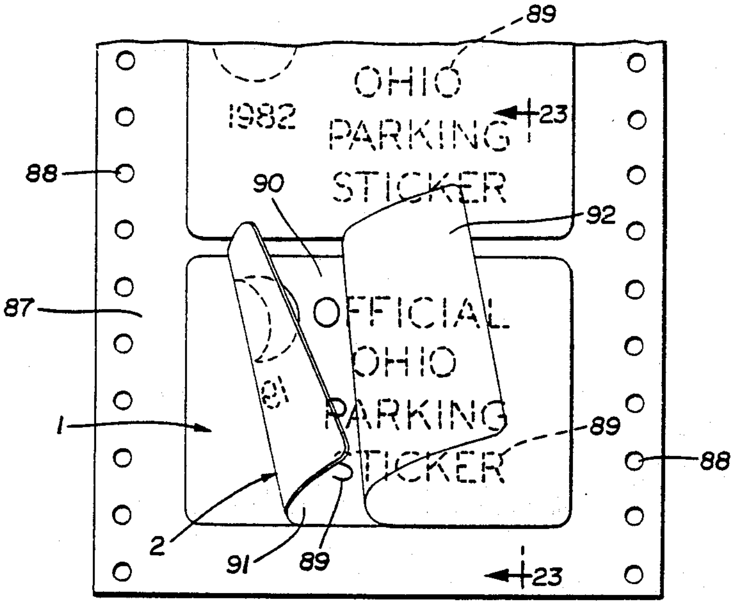
FIG. 22 is a diagrammatic top plan view showing another modified laminated member being removed from a base sheet.
Figure 23:
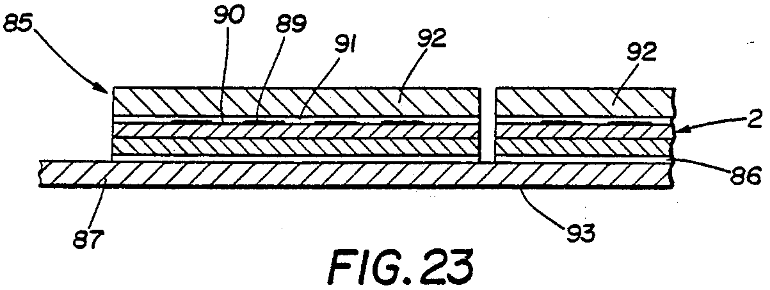
FIG. 23 is an enlarged fragmentary sectional view taken on line 23—23, FIG. 22.

Still another modification of the improved laminated member is shown in FIGS. 22 and 23 wherein the laminated member, indicated generally at 85, is in the form of a decal for attachment to a window or other transparent surface. Modified member 85 preferably is similar to the laminated member shown in FIGS. 14–18 in which thermally bonded plastic sheets 1 and 2 are attached by an adhesive 86 to a base sheet 87. Sheet 87 preferably is of the type having holes 88 along its outer edges whereby sheet 87 can be passed through an automatic printing machine or similar equipment.

In accordance with the advantage of modified laminated member 85, printed indicia 89 are printed on surface 90 of plastic sheet 2 prior to it being coated with a transparent pressure-sensitive adhesive 91. A sheet 92 having an adhesive release coating on one side thereof is applied over adhesive 91 to protect the adhesive until the decal is applied to a transparent surface. The method and equipment for applying adhesive 91 and adhesive release coating sheet 92 are similar to those shown and described above for the other laminated members and, therefore, are not described in detail and shown separately in the drawings.

Mailing addresses and names then can be printed by computer-controlled equipment on surface 93 of base sheet 87 and separated into individual laminated members or cards for subsequent mailing to individual customers or the like. Upon the customer receiving the mailer, plastic sheets 1 and 2 are separated from each other with sheet 1 remaining on base sheet 87. Next, release sheet 92 is removed to expose adhesive 91 which covers surface 90 of sheet 2 and printed indicia 89. The decal then is adhered by adhesive 91 to the inside surface of a vehicle window or the like, with printed indicia 89 being visible from the exterior of the vehicle.

Accordingly, the improved laminated member and method of making the same provides a member which is effective, safe, inexpensive, and efficient in use, and which achieves all the enumerated objectives, provides for eliminating difficulties encountered with prior laminated members and methods of making the same, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved laminated member is constructed, assembled and operated, the characteristics of the new construction, and the advantageous, new and useful results obtained; the new and useful structures, devices, elements, arrangements, parts, and combinations and method of making the same are set forth in the appended claims.

I claim:

1. A laminated member including:

(a) a carrier having an adhesive release coating applied to one side thereof;

(b) a first sheet of plastic having a pressure-sensitive adhesive on one side thereof releasably securing said first sheet of plastic on the side of the carrier having the release coating;

(c) a second sheet of plastic releasably secured generally throughout one side to another side of the first sheet of plastic;

(d) a top sheet of material having printed indicia thereon secured to another side of the second sheet of plastic; and (e) said sheets of plastic being releasably secured together with a greater force than the force provided by the adhesion between the first sheet of plastic and the carrier whereby the carrier may be stripped from the first sheet of plastic with said pressure-sensitive adhesive remaining on said first sheet for subsequent attachment of the joined plastic sheets and top sheet of material by said adhesive to a base sheet of material with said sheets of plastic being subsequently completely disengageable fom each other to provide two separated members without adhesive being exposed on either of the separated members.

2. The laminated member defined in claim 1 in which the second sheet of plastic film is transparent; and in which indicia are printed in mirror image on the other side of the second sheet whereby said printed indicia are visible on the top sheet of material when the sheets of plastic are separated from each other.

3. The laminated member defined in claim 2 in which a base sheet of material is mounted on the one side of the first sheet of plastic by the adhesive that is exposed after the carrier is stripped from said first plastic sheet; and in which said adhesive has a greater securing force than the force releasably securing together the joined sheets of plastic.

4. The laminated member defined in claim 1 in which the top sheet of material and two sheets of plastic are die cut into a plurality of individual laminated members releasably mounted on the carrier by the adhesive.

5. The laminated member defined in claim 1 in which the carrier is a flexible elongated strip of paper having a silicone coating on said one side thereof to provide the adhesive release coating.

6. The laminated member defined in claim 1 in which one of the first and second sheets of plastic is transparent polyester film, and in which the other one of said sheets is a combined sheet of polyester film and polyethylene film joined by an adhesive.

7. The laminated member defined in claim 6 in which the polyethylene film has an ethyl vinyl acetate additive.

8. The laminated member defined in claim 6 in which the sheet of transparent polyester film is approximately 2 mils thick; and in which the polyester film of the combined sheet is approximately ½ mil thick and the polyethylene film of said combined sheet is approximately 1½ mils thick.

9. The laminated member defined in claim 1 in which the first and second sheets of plastic are releasably secured together by thermal pressure.

10. A laminated member including:

(a) a base sheet;

(b) a first sheet of plastic bonded on one side thereof by an adhesive to the base sheet;

(c) one side of a second sheet of plastic releasably secured generally throughout said side to another side of the first sheet of plastic;

(d) a top sheet of material bonded to another side of the second sheet of plastic; and (e) printed indicia on either the top sheet or second sheet of plastic, said sheets of plastic being completely disengageable from each other to provide a separated first member comprising the second sheet of plastic and top sheet of material having printed indicia exposed thereon without adhesive being exposed on either the separated first member or remaining first plastic sheet and base sheet.

11. The laminated member defined in claim 10 in which the first and second sheets of plastic are releasably secured together at predetermined areas with other areas adjacent said secured areas being unsecured to provide lift areas for subsequently separating said sheets of plastic.

12. The laminated member defined in claim 11 in which predetermined areas of either the first or second sheets of plastic are coated with a release agent to prevent said sheets from being secured together in said coated areas to form the lift areas.

13. The laminated member defined in claim 12 in which the release agent is applied to said coated sheet in a plurality of spaced diamond-shaped areas forming a plurality of intersecting stripes, which stripes provide the releasably secured areas when the plastic sheets are releasably secured together.

14. The laminated member defined in claim 12 in which the release agent is an overprint release varnish having a silicone additive.

* * * * *